United States Patent [19]

Yane

[11] Patent Number: 5,021,151
[45] Date of Patent: Jun. 4, 1991

[54] PLASTIC IMPELLER PUMP AND FILTRATION UNIT FOR SEMI-CONDUCTOR ETCHING SYSTEM

[76] Inventor: Daryl J. Yane, 1182 Lake Martin Dr., Kent, Ohio 44240

[21] Appl. No.: 351,443

[22] Filed: May 12, 1989

[51] Int. Cl.$^5$ .............................. B01D 35/31
[52] U.S. Cl. ............................. 210/167; 156/345; 210/175; 210/416.1; 415/98; 415/217.1; 417/423.14; 417/423.15; 417/DIG. 1
[58] Field of Search ............... 210/133, 172, 175, 191, 210/205, 213, 218, 405, 415, 416.1–416.5; 415/217.1, 98, 212.1; 417/423.6, 423.11, 423.14, 423.15, DIG. 1; 156/345

[56] References Cited

U.S. PATENT DOCUMENTS

| | | | |
|---|---|---|---|
| 2,611,323 | 9/1952 | Digney | 415/217.1 |
| 3,119,342 | 1/1964 | White | 417/423.14 |
| 3,211,108 | 10/1965 | Mandorf, Jr. et al. | 415/217.1 |
| 3,241,493 | 3/1966 | Frey | 415/217.1 |
| 3,387,768 | 6/1968 | Zoehfeld | 415/217.1 |
| 3,397,135 | 8/1968 | Otto | 210/416.1 |
| 3,551,067 | 12/1970 | Wissman | 415/217.1 |
| 3,610,416 | 10/1971 | Otto | 210/416.1 |
| 3,612,715 | 10/1971 | Yedidiah | 415/217.1 |
| 3,637,331 | 1/1972 | Smith et al. | 415/217.1 |
| 3,752,603 | 8/1973 | Bunch | 417/424.1 |
| 3,826,589 | 7/1974 | Frank et al. | 415/217.1 |
| 3,920,352 | 11/1975 | Speck et al. | 415/217.1 |
| 4,130,488 | 12/1978 | Speck et al. | 210/416.1 |
| 4,534,816 | 8/1985 | Chenetal | 156/345 |
| 4,618,425 | 10/1986 | Yates | 210/416.1 |
| 4,756,826 | 7/1988 | Horvath | 210/416.1 |

FOREIGN PATENT DOCUMENTS 3024600 1/1982 Fed. Rep. of Germany ... 415/217.1
2485647 12/1981 France .............................. 417/423.6

OTHER PUBLICATIONS

Brochure Entitled CHEMKLEEN CF by WAFAB, Inc., No. CKE 10.1, Apr., 1986, Cl. 156/345.
Brochure entitled, FILTERCHEM, by Special Plastic Systems, No. 7/87, Cl. 156/345.

*Primary Examiner*—Robert A. Dawson
*Assistant Examiner*—Joseph Drodge
*Attorney, Agent, or Firm*—Fay, Sharpe, Beall, Fagan, Minnich & McKee

[57] ABSTRACT

A semi-conductor etching system includes a tub for holding a corrosive fluid that is maintained at an elevated temperature and a weir basket which is located in the tub and is also adapted to hold the corrosive fluid. A pump and filtration unit is located in the tub and includes a one piece corrosion and high temperature resistant housing having a pump chamber, a filter chamber spaced from the pump chamber, an inlet port for allowing fluid to flow into the housing and an outlet port for allowing fluid to flow out of the housing. A fluid passage is provided in the housing for allowing fluid to flow between the pump chamber and the filter chamber. A pump impeller is housed in the pump chamber of the unit and a filter is housed in the filter chamber. The housing and the pump impeller include a plastic material which can withstand the corrosive action of the high temperature corrosive fluid. A pipe communicates the pump and filtration unit outlet port with the weir basket.

25 Claims, 4 Drawing Sheets

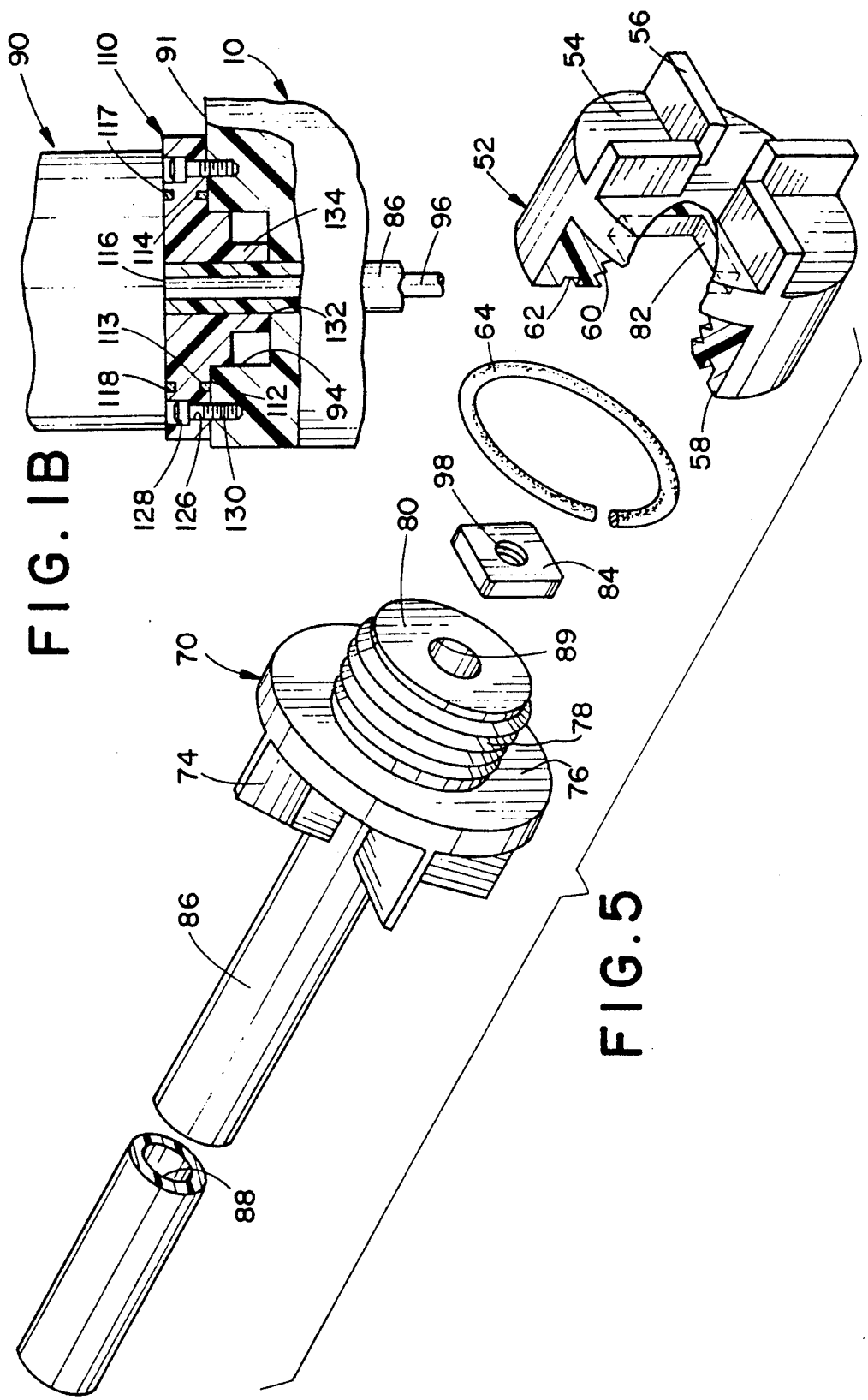

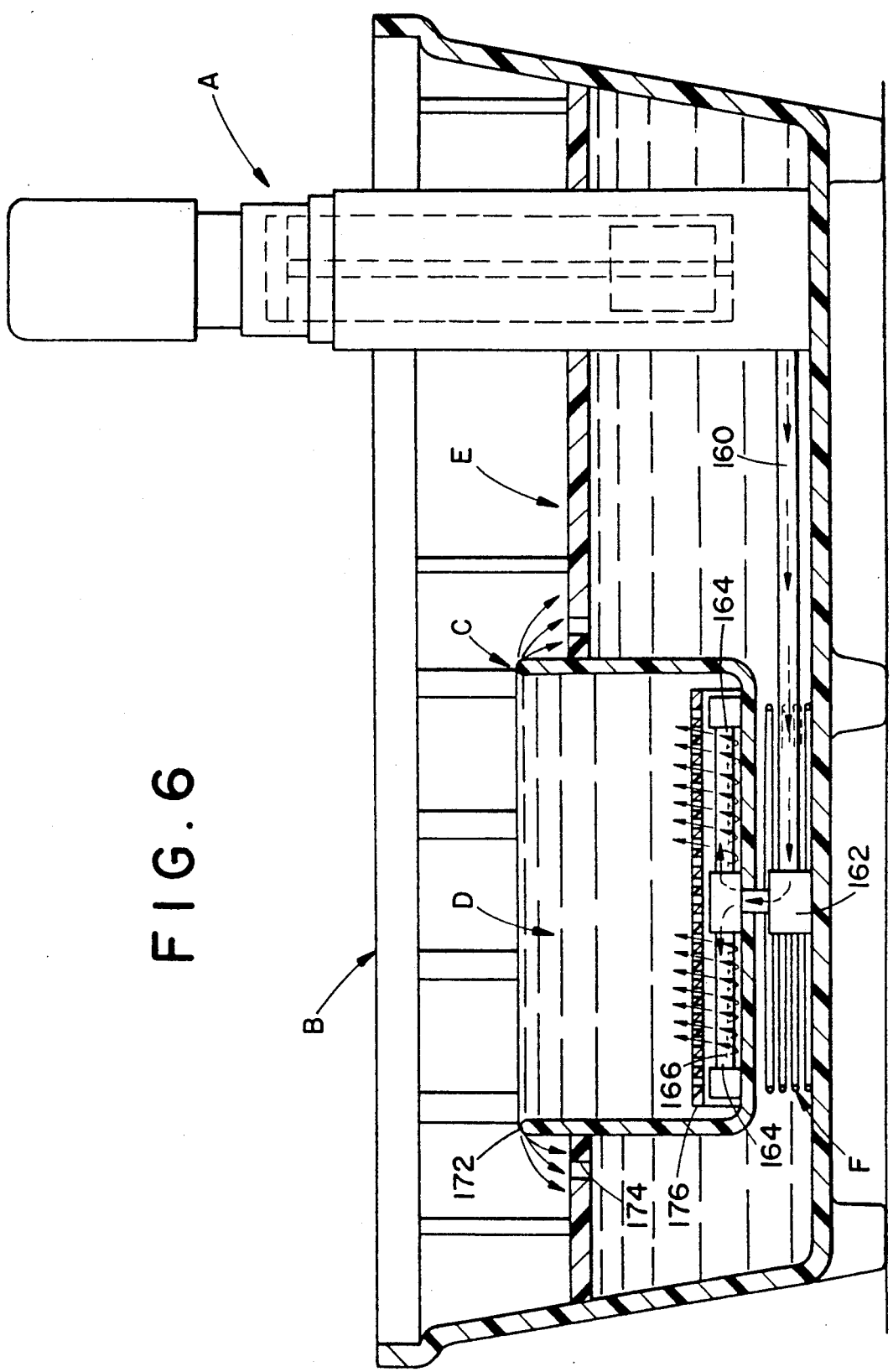

PLASTIC IMPELLER PUMP AND FILTRATION UNIT FOR SEMI-CONDUCTOR ETCHING SYSTEM

BACKGROUND OF THE INVENTION

The present invention pertains to pumping and filtration systems. More particularly, this invention relates to a pumping and filtration system for a corrosive chemical.

The invention finds particular application in the filtration of various fluids which are used in chemically etching semiconductor wafers. However, it should be appreciated that the invention also finds application in other environments in which it is necessary to filter a chemical, especially a corrosive fluid held at a high temperature.

Apparatus which is used to etch semiconductor wafers during their manufacture generally includes open-topped chemical baths which include a tank containing an etching solution and a weir basket held in the tank with the weir basket overflowing its top into the tank. The etching process takes place in the weir basket. The resultant waste products from the etching process float to the top of the solution or chemical in the weir basket and then flow into the tank. The chemical in the tank is pumped through a filter and the filtered chemical is subsequently returned to the weir basket for reuse. Such chemicals can be suitable conventional etching or cleaning fluids such as: sulfuric acid, hydrochloric acid, nitric acid, phosphoric acid, sodium hydroxide or potassium hydroxide.

Most filtration systems for such chemicals provide a filtration cartridge and a pump, for urging fluid through the cartridge, adjacent the tub. This type of system needs fittings and piping to interconnect the tub with the pump, the pump with the filter and the filter with the weir basket. Such fittings and piping need to be made of corrosion resistant plastic materials like PVDF or PTFE such as Teflon ®. The problem with the use of such fittings an piping is the fact that the high temperature corrosive chemical softens the piping and fittings and may therefore cause leaks to occur at the joints of the fittings.

Another known system utilizes an integral submersible pump and filter unit positioned directly in the tub. However, this known unit utilizes a gas driven double-acting bellows pumping assembly which is complicated in its construction and is therefore expensive to manufacture. This unit also employs a multitude of valves which can be prone to failure. The bellows units utilized can also be prone to failure. Whenever any of these components fails, of course, the etching system is disabled and the entire unit needs to be removed and disassembled so that the faulty component can be replaced.

Accordingly, it has been considered desirable to develop a new and improved corrosive chemical filtration system which would overcome the foregoing difficulties and others while providing better and more advantageous overall results.

BRIEF SUMMARY OF THE INVENTION

In accordance with the present invention, a new and improved pump and filtration unit is provided.

More particularly in accordance with this aspect of the invention, the unit comprises a pump including an impeller made of a plastic material, a filter and a one piece plastic housing. The housing includes a pump chamber for housing the pump impeller and a filter chamber for housing the filter. The filter chamber is spaced from the pump chamber. The housing further includes an inlet port for allowing fluid flowing into the housing to be acted on by the pump impeller and the filter and an outlet port which allows an exit of fluid from the housing after it has been acted on by the pump impeller and the filter.

In accordance with another aspect of the invention, a pump and filtration system for high temperature corrosive fluids is provided.

More particularly in accordance with this aspect of the invention, the system comprises a pump including an impeller, a filter and a housing. The housing comprises a pump chamber for housing the pump impeller and a filter chamber for housing the filter in spaced relation to the pump chamber. An inlet port allows fluid to flow into the housing and the pump chamber thereof. A passage between the pump chamber and the filter chamber allows fluid to flow from an outlet of the pump chamber to an inlet of the filter chamber. An outlet port in the housing allows fluid to flow out of the filter chamber and the housing.

According to still another aspect of the invention, a pump and filtration assembly for high temperature corrosive fluids is provided.

More particularly in accordance with this aspect of the invention, the assembly comprises a housing including a pump chamber, a filter chamber spaced from the pump chamber, a passage extending between the pump chamber and the filter chamber, an inlet and an outlet. The assembly further comprises a pump including an impeller located in the pump chamber an impeller shaft sleeve secured at one end to the impeller and a drive shaft for the impeller. The pump chamber has an inlet in communication with the housing inlet and an outlet in communication with the passage in the housing. A filter is located in the filter chamber which has an inlet communicating with the housing passage and an outlet communicating with the housing outlet.

According to another aspect of the invention, a semiconductor etching system is provided.

More particularly in accordance with this aspect of the invention, the system comprises a tub for holding a corrosive fluid that is maintained at an elevated temperature, a weir basket located in the tub and adapted to hold the corrosive fluid and a pump and filtration unit also located in the tub. The unit comprises a one-piece corrosion and high temperature resistant housing. The housing includes a pump chamber, a filter chamber spaced from the pump chamber, an inlet port in the housing for allowing fluid to flow into the housing, an outlet port for allowing fluid to flow out of the housing and a fluid passage for allowing fluid to flow between the pump chamber and the filter chamber. A pump impeller is housed in the pump chamber with the impeller being made of a corrosion and high temperature resistant material. A filter is housed in the filter chamber. A pipe communicates the outlet port of the pump and filtration unit with the weir basket.

One advantage of the present invention is the provision of a new and improved pump and filtration unit.

Another advantage of the present invention is the provision of a pump and filtration unit which is capable of handling high temperature corrosive fluids.

Still another advantage of the present invention is the provision of a one-piece plastic housing for holding both an impeller section of a pump and a filter. The housing can be seated in a tub or bath of a corrosive fluid held at an elevated temperature.

Yet another advantage of the present invention is the provision of a pump and filtration unit for high temperature corrosive fluids which does away with the necessity of using tubing and fittings for interconnecting a tub of corrosive fluid with the pump and the filter.

A further advantage of the present invention is the provision of a semiconductor etching system including a tub for holding a corrosive fluid, a weir basket held in the tub and a one-piece pump and filtration unit also held in the tub.

A still further advantage of the present invention is the provision of a semiconductor etching system which includes a top wall selectively detachable from a corrosive fluid holding tub. The top wall is apertured so as to correctly locate and hold a weir basket and a one piece pump and filtration housing in the tub.

An additional advantage of the present invention is the provision of a pump and filtration unit including a plastic impeller and a plastic impeller shaft sleeve secured thereto which protects a drive shaft of a pump motor from contact with corrosive fluids. The system further includes a drive plate embedded in the impeller to which drive plate the motor drive shaft is secured.

A yet further advantage of the present invention is the provision of an impeller which includes two sections which can be selectively secured to each other. Each of the sections is provided with at least one impeller vane.

Still further advantages of the present invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 1B is a partially broken away view of a portion of the unit of FIG. 1A along an axis substantially at 45° to the axis along which FIG. 1A is shown;

FIG. 5 is an enlarged exploded perspective view, partially broken away, of an impeller and an impeller sleeve of the unit of FIG. 1; and, FIG. 6 is a reduced size partial cross-sectional view of a semiconductor etching system utilizing the pump and filtration unit of FIG. 1.

DETAILED DESCRIPTION OF THE PREFERRED EMBODIMENT

Figure 1A:
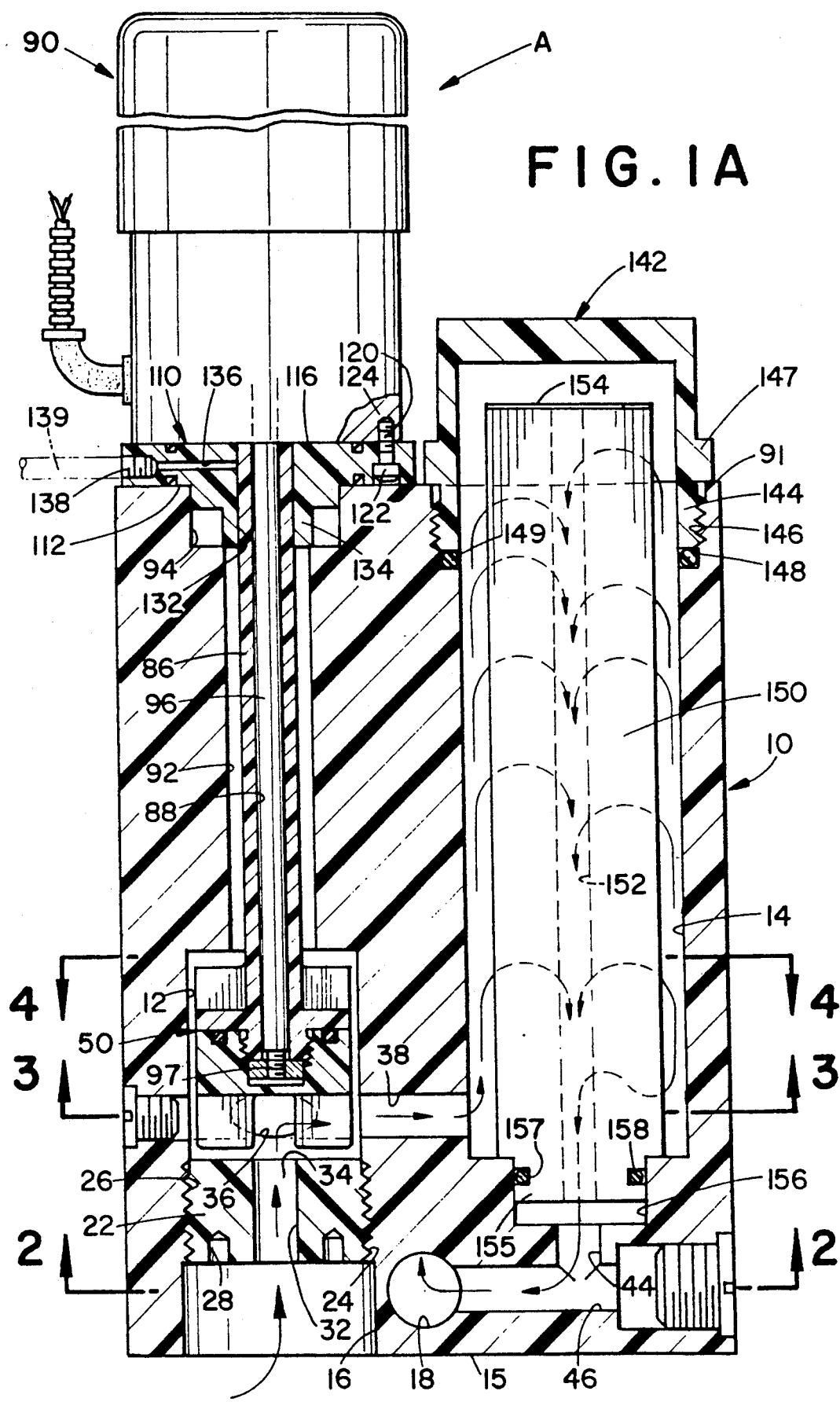
FIG. 1A is a front elevational view, in partial cross-section, of a pump and filtration unit according to the present invention.

Referring now to the drawings, wherein showings are for purposes of illustrating a preferred embodiment of the invention only and not for purposes of limiting same, FIG. 6 shows a semiconductor etching system comprising a pump and filtration unit A located in a tub B together with a weir basket C. The tub holds a corrosive chemical solution or fluid D which overflows the top of the weir basket C and partially engulfs the unit A. The weir basket C and the unit A are held in place in the tub by a top wall E, and a heater F is provided beneath the weir basket. While the pump and filtration unit will be described in connection with a semiconductor etching system, it should be appreciated that the pump and filtration unit could also be adapted for use in many other environments in which it is necessary to isolate certain components from a corrosive environment or where a unitary housing is necessary since piping and fittings can not be used.

Figure 2:
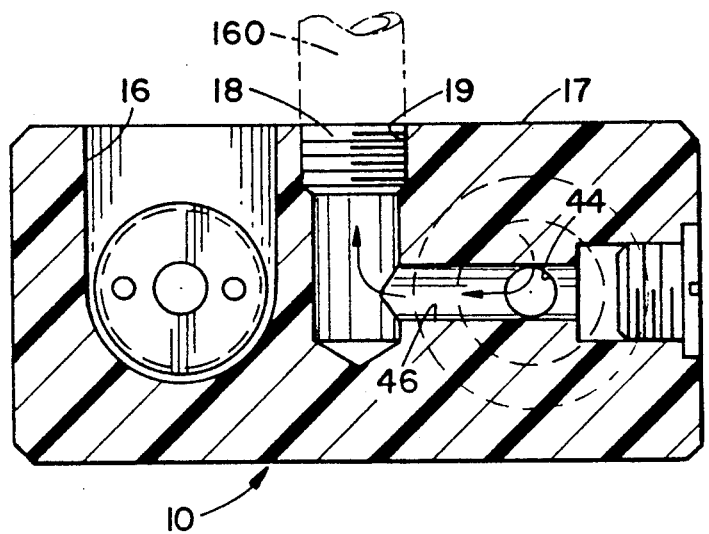
FIG. 2 is a cross-sectional view of the unit of FIG. 1 along line 2—2.

With reference now to FIG. 1A, the unit A comprises an integral housing member 10 which includes therewithin a pump chamber 12 and a filter chamber 14 spaced therefrom. In the embodiment illustrated, both of these chambers extend longitudinally in the housing 10 in a spaced side-by-side arrangement. Provided on a lower face 15 of the housing, which face contacts the bath B, is an inlet port 16. Located on a front face 17 of the housing (see FIG. 2) is an outlet port 18, which preferably has a threaded section 19 for connection with a suitable pipe. Preferably, a large size inlet port 16 is provided for the housing 10 in order to prevent any cavitation problems as the pump operates.

Fastened in the housing 10 adjacent the inlet port 16 is a cylindrical member 22 which has a threaded outer periphery 24 that cooperates with a suitable threaded section 26 provided on the housing adjacent the port 16. The cylindrical section 22 is provided with suitable spanner wrench apertures 28 which allow the cylindrical section to be selectively threaded into place on the housing.

Figure 3:
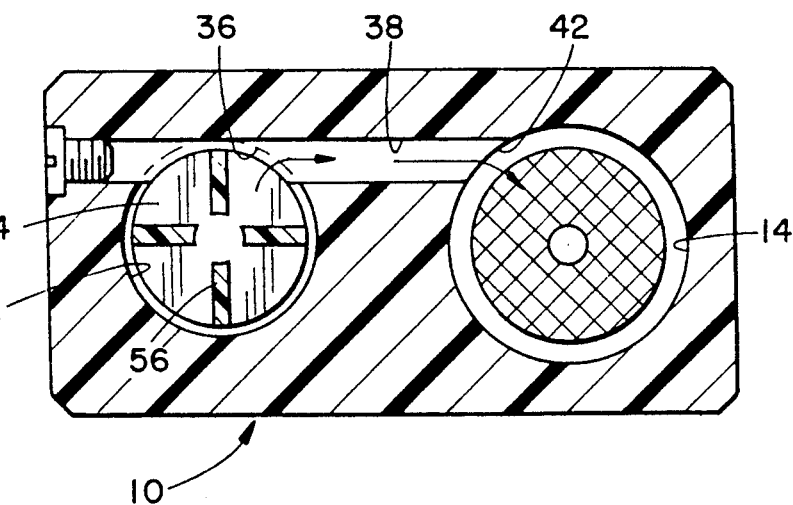
FIG. 3 is a cross-sectional view of the unit of FIG. 1 along line 3—3.

Extending longitudinally through a central portion of the cylindrical section is a bore 32 which allows a communication of fluid from the inlet port 16 to a pump chamber inlet 34. The bore 32 is suitably sized to deliver the appropriate amount of fluid to the inlet 34. With reference now also to FIG. 3, spaced from the pump chamber inlet 34 is a pump chamber outlet 36 which communicates with a bore 38. The bore 38 extends from the pump chamber outlet 36 to a filter inlet 42 of the filter chamber 14. Also provided in the housing in a spaced manner from the filter chamber inlet is a filter chamber outlet 44 which communicates with a bore 46 that leads to the outlet port 18. In this way, fluid is capable of flowing through the inlet port 16 to the pump chamber 12 and thence to the filter chamber. After passing through the filter chamber, the fluid can flow out the outlet port 18.

Located in the pump chamber 12 is an impeller 50. With reference now also to FIG. 5, the impeller comprises a first or front section 52 which is substantially cylindrical in shape and has a forward face 54. Positioned on the forward face is at least one impeller vane 56. In the preferred embodiment four such impeller vanes of a suitable size and a rectangular shape are utilized. However, it should be recognized that any other suitable number of impeller vanes of any suitable size and shape could be provided as may be necessary for the pumping environment in which the impeller 50 operates. Located on a rear face 58 of the first impeller section 52 is a threaded aperture 60. Located radially outwardly of the threaded aperture on the rear face 58 is a slot 62 which is adapted to hold a seal member 64 which may be an O-ring seal.

Figure 4:
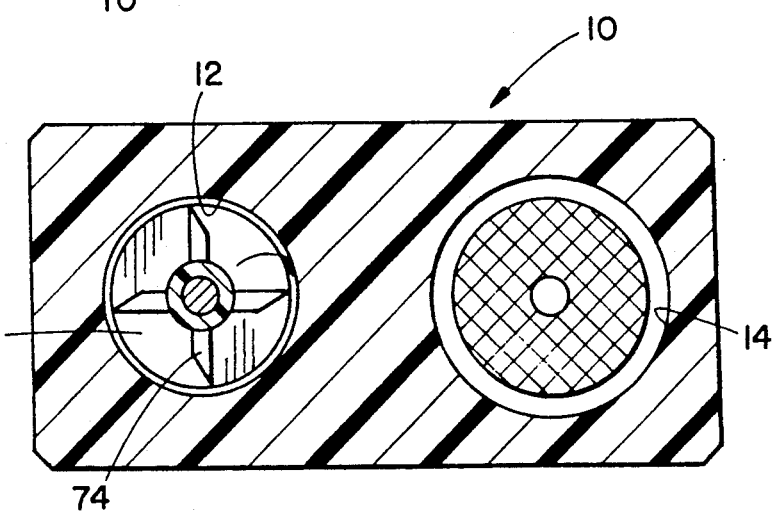
FIG. 4 is a cross-sectional view of the unit of FIG. 1 along line 4—4.

The impeller 50 also comprises a second impeller section 70 which also has a suitable cylindrical-type shape. With reference now also to FIG. 4, the section 70 has on a rear face 72 thereof at least one impeller vane 74. In the embodiment illustrated four such impeller vanes 74 of a given size and shape are provided on the rear face. However, it should be recognized that any other suitable number of vanes of any desired size and shape may be utilized as necessary for the particular environment in which the impeller operates. Located on a forward face 76 of the second section 70 is a threaded reduced diameter stem portion 78 which is adapted to cooperate with the threaded aperture 60 in the first section to enable the two sections to be secured to each other. In other words, the cooperating threaded sections operate as a fastening means for securing the two sections 52 and 70 to each other. When the second section is threaded into the first section, a front face 80 of the stem adjoins a slot 82 provided in the first section. A drive plate or nut 84 is adapted to be located in the slot 82.

Also secured at one end to the second section 70 is a shaft sleeve 86 which has a bore 88 extending longitudinally therethrough such that it also extends longitudinally through the second section 70 and the stem front face 80 through a port 89.

With reference now again to FIG. 1, a motor 90 is secured to an upper face 91 of the housing 10. Extending longitudinally through the housing 10 from the impeller chamber 12 to the upper end face 91 is a bore 92 for accommodating the shaft sleeve 86. Extending from the upper face 91 is a counterbore 94. The motor 90 is so positioned on the housing 10 that a motor shaft 96 thereof can extend through the bore 88. A free end of the shaft 96 is provided with a threaded stem 97 which is suitably sized so that it can engage with a threaded aperture 98 provided in the drive plate 84 (see FIG. 5).

One advantage of providing the drive plate 84 in the impeller is to assure a positive rotation of the impeller at elevated temperatures which cause the plastic material from which the impeller and the shaft sleeve 86 thereof to soften somewhat. Preferably, the housing 10, the impeller 50 and the sleeve 86 are made of a suitable corrosion and high temperature resistant plastic material such as PTFE (polytetrafluoroetylene). However, it should be recognized that other suitable materials could also be employed.

One of the reasons for employing the cylindrical member 22 is that it allows the removal of the impeller 50 through the front of the housing through inlet port 16 once the member is detached by use of a suitable spanner wrench and the impeller is detached from the drive shaft or motor shaft 96.

It should be noted that the upper or second section 70 of the impeller 50 is more efficient than is the lower or first section 52 so as to get a positive suction down from the top. In other words, the impeller vanes 74 on the rear face 72 are more efficient than the impeller vanes 56 on the forward face 54 in order to prevent any fluid from being pushed up the bore 98 by the action of the impeller 50. It is noted in this regard that the forward faces of the rear vanes 74 are angled whereas the forward faces of the front vanes 56 are straight edged.

Preferably, the impeller 50 is of the centrifugal pump type. The motor 90 can be a fractional horse power motor which is suitably sized for the environment in which the pump and filtration unit A operates.

With reference now also to FIG. 1B, a pump adapter plate 110 is located between the pump 90 and the housing 10. The adapter plate 110 includes a forward face 112 having a circular groove 113 for housing a suitable seal member 114 which seals between the housing 10 and the plate 110. Similarly, located on a rear face 116 is a groove 117 for accommodating a suitable seal member 118 for sealing between the pump 90 and the plate 110. Extending longitudinally through the plate 110 is a bore 120 which is suitably sized so as to house a fastener 122 for securing the plate to a motor housing 124 of the pump 90. Similarly, a bore 126 extends in spaced relation to the bore 120 and accommodates a fastener 128 for securing the pump adapter plate 110 to the housing 10 by extending into an aperture 130 in the housing.

A bore 132 extends longitudinally through the center of the adapter plate 110 for accommodating an end portion of the shaft sleeve 86. Provided on the forward face 112 of the adapter plate is a flanged section 134 which extends into the counterbored section 94 of the housing upper face 91.

Extending radially inwardly from an outer periphery of the plate 110 to its central aperture 130 is a gas delivery channel 136 which includes a threaded outer end 138 to which a suitable gas delivery tube 139 can be threaded (the channel 136 is shown out of position in FIG. 1A for the sake of clarity). The tube 139 is utilized for delivering a neutral gas, such as nitrogen or carbon dioxide, to the aperture 130 and thence to the outer periphery of the shaft sleeve 86. In this way, the gas can flow down the bore 98 as well as upwardly into the motor housing 124. The gas is utilized in order to prevent corrosive fumes from the fluid D from entering and contaminating an electric motor held in the motor housing 124.

It should be noted that another conventional way of protecting an electric motor from contamination and corrosion by corrosive fumes from the chemical D is through the use of a suitable conventional bonnet (not illustrated) into which a neutral gas is pumped so as to prevent the entry of harmful corrosive vapors from the etching solution into the bonnet and thence into the motor housing.

Located on the upper face 91 of the housing 10 in a spaced manner from the motor 90 is a Cap 142 which closes an upper end of the filter cavity 14. The cap 142 includes a lower threaded section 144 which cooperates with a suitable threaded portion 146 provided at the upper end of the housing wall around filter cavity 14. The cap 142 can be threaded down into the filter chamber as far as is allowed by a flanged section 147 thereof. When the cap is secured on the housing 10, there is defined a slot 148 between them. Positioned in the slot is a suitable seal element 149 which may be an O-ring seal or the like for sealing the filter chamber 14 against communication with the environment.

Located in the filter chamber is a suitable filter element 150 which can be a hollow center filter such that the corrosive fluid to be filtered flows radially inwardly from the outer periphery of the filter to its center and then out a central longitudinally extending aperture 152 thereof to the filter chamber outlet 44. Preferably, the filter is also made from a suitable plastic material, such as PTFE (polytetrafluoroethylene) to resist the corrosive action of the fluid being pumped. The filter is preferably of the membrane type and has the capacity of filtering down to 0.2 microns.

The filter has a closed upper end 154 and a reduced diameter lower or outlet end 155 which is so sized as to tightly fit into a suitably configured section 156 of the housing 10. A groove 157 is provided in the outlet end 155 for holding a suitable seal member 158. Thus the filter 150 is held in place in the housing 10 only at its outlet end and is otherwise spaced from the filter chamber walls in order to allow fluid to flow therethrough.

In the embodiment illustrated in the drawings, the filter 150 is located downstream from the pump impeller 50 so that the pump urges pressurized fluid into the filter. This is necessary because of the small micron size of the filter concerned. However, it should be recognized that the reverse arrangement, that is, filtering a fluid that is pulled through a filter by a pump could be also utilized with a different type of filter and a different type of pump. However, in the semiconductor etching field it is advantageous to have the pump located upstream from the filter in order that the filter be capable of filtering any impurities (such as small plastic particles) shed by the pump.

With reference now again to FIG. 6, extending from the outlet port 18 of the housing 10 is a pipe first section 160 which has a threaded first end that is threaded into the outlet port threaded section 19. The pipe first section is connected to a second section 162. Together, these sections 160, 162 extend radially into the heater coil F and axially out of the coil into the weir basket C. In fluid connection with the second section 162 are pipe members 164 that have sealed ends. These pipes are also provided with a plurality of slots 166 through which the now cleaned fluid is emitted in the weir basket C. As mentioned, the pipe 160 extends radially into and axially out of the heater element F which is utilized for heating the fluid D to a suitable temperature. Such a temperature can be as high as 100° C. or even 150° C.

The unit A and the weir basket C are suitably held in position in the bath B by the top wall section E. As the fluid held in the weir basket C overflows the top edge 172 thereof, the fluid flows onto the top wall E and therethrough by wa of suitable apertures 174 provided therein. In this way, the fluid can again enter the housing A and be cleaned therein.

Located in the weir basket C is a stand 176 which holds the microelectronic circuits or chips (not illustrated) which need to be etched by the fluid in the weir basket C.

The invention has been described with reference to a preferred embodiment. Obviously, modifications and alterations will occur to others upon the reading and understanding of the preceding specification. It is intended that the invention be construed as including all such alterations and modifications insofar as they come within the scope of the appended claims or the equivalents thereof.

Having thus described the present invention, what is claimed is:

1. A pump and filtration unit comprising:
   a pump including an impeller made of a plastic material;
   a filter; and,
   a one piece plastic housing wherein said housing and said impeller are made of a material which is resistant to high temperature corrosive fluids, that are maintained at a temperature on the order of 100° C., said housing including:
   a pump chamber for housing said pump impeller,
   a filter chamber for housing said filter, wherein said filter chamber is spaced from said pump chamber by a wall of said housing,
   an inlet port in said housing for allowing fluid to flow into said housing to be acted on by said pump impeller and said filter, and
   an outlet port in said housing for allowing an exit of fluid from said housing after it has been acted on by said pump impeller and said filter.

2. The unit of claim 1 wherein said pump further comprises an impeller sleeve secured at one end to and wherein said impeller and said sleeve comprise a plastic material.

3. The unit of claim 1 wherein said housing comprises a solid block of said material in which block said pump chamber, said filter chamber and said inlet port and said outlet port are defined.

4. The unit of claim 1 further comprising a disk-shaped member which is threaded along its outer periphery so as to be selectively threadable into a suitably threaded section of said housing adjacent said inlet port, said member having a bore extending longitudinally therethrough in order to allow communication between said inlet port and said pump chamber.

5. The unit of claim 1 wherein said housing further comprises a passage between said pump chamber and said filter chamber and wherein said passage allows fluid to flow from an outlet of said pump to an inlet of said filter.

6. The unit of claim 1 further comprising a pump adaptor plate having a cylindrical portion of a suitable diameter so as to substantially close an open end of said pump chamber.

7. The unit of claim 6 further comprising at least a first fastener for fastening a pump motor housing to said pump adapter plate and at least a second fastener for securing said pump adaptor plate to said one piece plastic housing.

8. The unit of claim 1 further comprising a filter cap which can be detachably secured onto an open end of said filter chamber.

9. The unit of claim 1 wherein said inlet port in said housing communicates with said pump chamber and said outlet port in said housing communicates with said filter chamber so that said pump chamber is located upstream from said filter chamber.

10. A pump and filtration system comprising:
    a pump comprising:
    an impeller having a body,
    an impeller shaft sleeve joined at one end to said impeller body,
    a drive shaft which extends through said impeller shaft sleeve whereby said drive shaft will not be exposed to the fluid, and
    a drive plate embedded in said impeller body so as not to be exposed to the fluid, and wherein said drive shaft is secured at one end to said drive plate;
    a filter; and,
    a one piece plastic housing comprising:
    a pump chamber for housing said pump impeller,
    a filter chamber which is for housing said filter in spaced relation from said pump impeller,
    an inlet port for allowing a fluid to flow into said housing and said pump chamber thereof,
    a passage between said pump chamber and said filter chamber for allowing fluid to flow from an outlet of said pump impeller to an inlet of said filter, and an outlet port for allowing a fluid to flow out of said filter chamber and said housing, said housing and said impeller being made of a material which is resistant to high temperature corrosive fluids.

11. The system of claim 10 wherein said impeller comprises:
- a first section including a substantially cylindrical body having a forward face with at least one impeller vane extending outwardly therefrom;
- a second section including a substantially cylindrical body having a rearward face with at least one impeller vane extending outwardly therefrom;
- a means for securing said first and second sections to each other; and,
- wherein said drive plate is embedded in one of said first and second sections.

12. The system of claim 11 wherein said means for securing comprises cooperating threaded portions provided on said first and second sections.

13. The system of claim 10 further comprising a means for delivering a gas to said impeller shaft sleeve.

14. A pump and filtration assembly comprising:
- a one piece plastic housing including a pump chamber, a filter chamber spaced from said pump chamber, a passage extending between said pump chamber and said filter chamber, an inlet and an outlet;
- a pump including an impeller body located in said pump chamber and a drive shaft for said impeller, wherein said pump impeller body comprises:
  - a first section including a forward face having at least one impeller blade thereon,
  - a second section including a rearward face having at least one impeller blade thereon wherein said impeller blades of said first and second sections extend parallel to an axis of said drive shaft, and
  - a means for securing said first and second sections together, said pump chamber having an inlet in communication with said housing inlet and an outlet in communication with said passage in said housing; and,
- a filter located in said filter chamber, said filter chamber having an inlet communicating with said housing passage and an outlet communicating with said housing outlet said housing and said impeller being made of a material which is resistant to high temperature corrosive fluids.

15. The assembly of claim 14 wherein said pump further comprises an impeller shaft sleeve which is secured at one end to said impeller, wherein said drive shaft extends inside said shaft sleeve.

16. The assembly of claim 15 wherein said impeller shaft sleeve and said pump impeller second section are made of a single piece of material.

17. The assembly of claim 14 wherein said pump further comprises a drive plate embedded in one of said first and second sections.

18. The assembly of claim 14 wherein said pump further comprises a seal means for sealing between said first and second sections.

19. A semiconductor etching system comprising:
- a tub for holding a corrosive fluid that is maintained at a temperature on the order of 100° C.;
- a weir basket located in said tub and adapted to hold the corrosive fluid;
- a pump and filtration unit located in said tub, in spaced relation to said weir basket and partially immersed in the corrosive fluid, said unit comprising a one piece corrosion and high temperature resistant housing including:
  - a pump chamber,
  - a filter chamber spaced from said pump chamber,
  - an inlet port in said housing for allowing fluid to flow into said housing,
  - an outlet port for allowing fluid to flow out of said housing, and
  - a fluid passage in said housing for allowing fluid to flow between said pump chamber and said filter chamber;
- a pump impeller housed in said pump chamber wherein said housing and said pump impeller comprise a plastic material which can withstand the corrosive fluid;
- a filter housed in said filter chamber; and,
- a pipe which communicates said pump and filtration unit outlet port with said weir basket.

20. The system of claim 19 wherein said tub and said weir basket comprise a plastic material.

21. The system of claim 19 wherein said outlet port is threaded in order to permit a threaded end of said pipe to be threaded thereinto.

22. The system of claim 19 further comprising an apertured top wall which fits into said tub and contacts a plurality of inner walls thereof, said top wall having suitable apertures for accommodating said weir basket and said pump and filtration unit.

23. The system of claim 22 wherein said top wall further comprises fluid flow apertures for allowing a flow of fluid from said weir basket back into said tub.

24. The system of claim 19 further comprising a heater coil located below said weir basket.

25. The system of claim 24 wherein said pipe comprises:
- a first section which leads filtered fluid from said pump and filtration unit into said heater coil;
- a second section connected to said first section which leads fluid from said first section into said weir basket; and,
- a third section accommodated in said weir basket and connected to said second section for dispersing heated and filtered fluid in said weir basket.

* * * * *